June 14, 1932.  F. B. STOVER  1,862,833
COUPLING FOR RUBBER COVERED TUBING
Filed Dec. 23, 1931
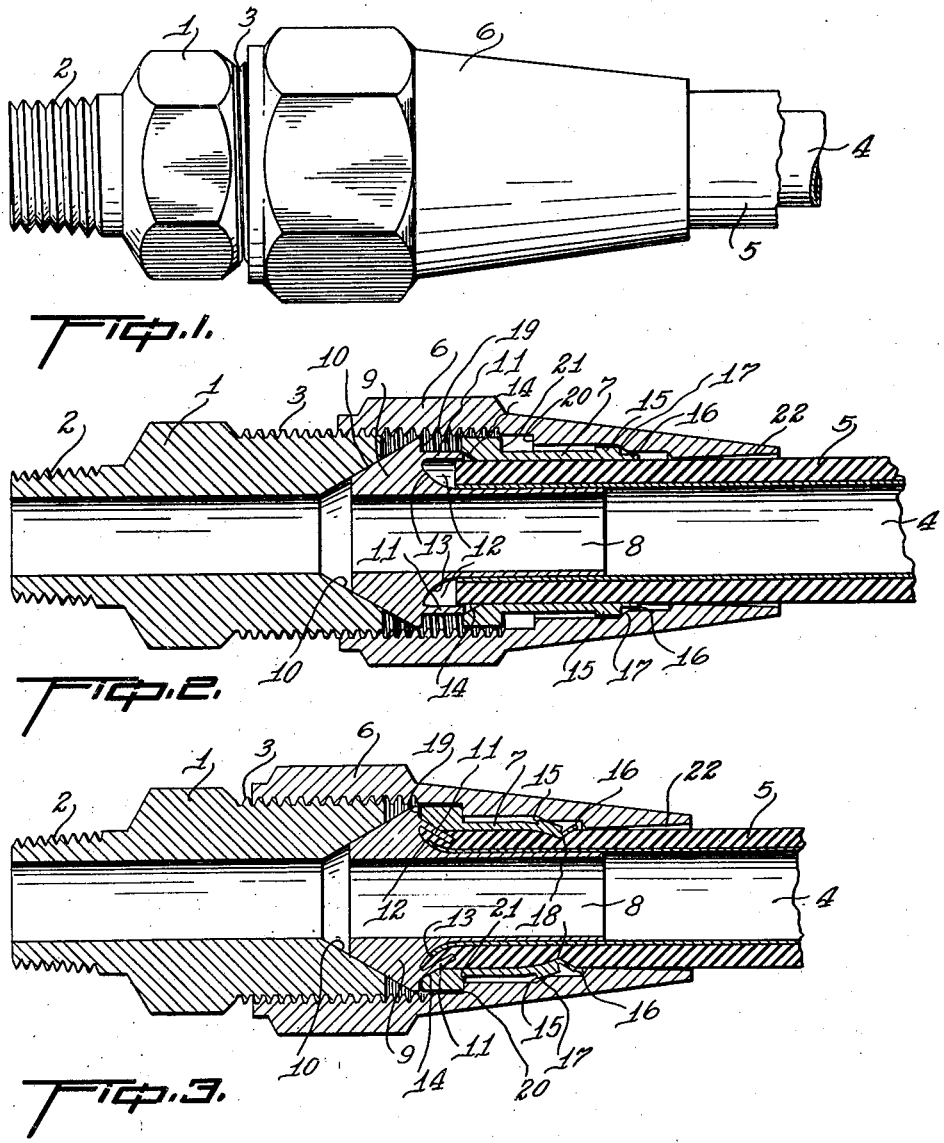
INVENTOR
Frank B. Stover
BY
ATTORNEYS Patented June 14, 1932

1,862,833

UNITED STATES PATENT OFFICE

FRANK B. STOVER, OF DETROIT, MICHIGAN, ASSIGNOR TO SKY SPECIALTIES CORPORATION, OF DETROIT, MICHIGAN, A CORPORATION OF MICHIGAN

COUPLING FOR RUBBER COVERED TUBING

Application filed December 23, 1931. Serial No. 582,741.

The present invention pertains to a novel means for joining tubing having a covering of yielding material such as fabric impregnated with rubber. Tubing of this class is identified herein by the expression "rubber covered tubing".

Hitherto, it has been customary to keep in stock standard lengths of tubing already equipped with coupling means at one or both ends. In such cases the nature of the coupling is such as to require special operations performed on the tubing, and hence the lengths of the tubing are previously equipped with the couplings.

In many cases, such as airplane repair work at air ports, odd lengths of rubber covered tubing must often be installed, and thus there is a demand for a coupling that may readily be applied to the tubing without the use of special tools or processes. The object of the present invention, therefore, is to provide an efficient and reliable coupling of this character.

The invention is fully disclosed by way of example in the following description and in the accompanying drawing, in which Fig. 1 is an elevation of a coupling completed according to the invention;

Fig. 2 is a longitudinal section of the coupling before being tightened, and

Fig. 3 is a longitudinal section of the coupling after being tightened.

Reference to these views will now be made by the use of like characters which are employed to designate corresponding parts throughout.

The numeral 1 indicates a fitting or coupling member having a threaded end 2 adapted to be screwed into a receptacle, such as a tank, crank case, machine casing or the like. The other end of this member is also threaded at 3 for the attachment of the coupling which brings the tubing into fluid communication with the receptacle. The tubing is of conventional construction embodying a suitable metal tube 4 covered by a flexible material 5, such as woven fabric impregnated with rubber. The tube 4, however, may be of less thickness than usual, as will presently appear.

In making the connection, a nut 6 is first slipped over the tubing, and then a ferrule 7 is slipped over the tubing. The ferrule fits rather snugly around the tubing, as may be seen in Figs. 2 and 3, and is received within suitable clearance provided in the nut as also illustrated. A tubular member 8 is then inserted within the tubing 4, and this member is formed with a conical head 9 which is received in a conical seat 10 formed in the free or outer end of the member 1. The head is formed with an annular flange 11 concentric with the tubular portion 8 and forming therewith an annular channel 12 adapted to receive the annular wall of the rubber covered tubing. It will be seen, however, that the flange 11 is considerably shorter than the portion 8 and that the base of the channel 12 is gradually reduced in width, as indicated by the numeral 13.

The forward end of the ferrule 7 has an internal conical surface 14 which engages over the free edge of the flange 11 in the loose assembly of the device illustrated in Fig. 2. A shoulder 15 is formed externally on the ferrule 7 near the rear extremity 16 thereof and is engageable by a sloped shoulder 17 extending inward from the nut 6. The nut is of such size as to be screwed on the threads 3, and the coupling is secured by the forcible screwing of the nut on the member 1.

In this action, the shoulder 17 bears against the shoulder 15 and forces the adjacent part of the ferrule into the material 5 as indicated by the numeral 18 in Fig. 3. At the same time, the extremity 16 is directed outwardly from the material 5 to avoid cutting of the material by vibration at this end. The gripping of the tubing by the ferrule in this manner causes the tubing to advance with the nut and ferrule until it is securely seated in the base of the channel 12. The simultaneous movement of the conical surface 14 over the flange 11 directs the latter angularly into the material 5 until movement of the ferrule is limited by its abutting against a shoulder 19 formed on the conical head 9 outwardly of the flange. The movement of the ferrule and hence of the tubing to this final position is further assured by another shoulder 20 of the nut which comes into engagement with the shoulder 21 of the ferrule.

It will be seen in Fig. 3 that a quantity of flexible material 5 is packed or compressed within the flange 11 and into the bottom of the channel 12, thereby resisting any tendency of the tubing to be pulled off the tubular portion 8. This tendency is also resisted by the penetration of the rear part of the ferrule into the material 5 as already described. The rear end of the nut 6 is preferably flared, as at 22, out of contact with the material 5 to avoid cutting by vibration.

The tubular portion 8 is of sufficient strength to serve as a base against the pressure exerted by the nut. Consequently the tubing 4 need not be relied upon for internal support and hence may be thinner than usual or as thin as physically possible.

Although a specific embodiment of the invention has been illustrated and described, it will be apparent that various alterations in the detail of construction may be made without departing from the scope of the invention as indicated by the appended claims.

What I claim is:—

1. A coupling for tubing covered with a yielding material, comprising a threaded member to which the tubing is to be coupled, an annular member abutting said threaded member and having an annular flange adapted to receive the tubing, a nut adapted to surround the tubing and to be screwed on said threaded member, and means associated with said nut for forcing said flange angularly into the yielding material on screwing of said nut.

2. A coupling for tubing covered with a yielding material, comprising a threaded member to which the tubing is to be coupled, an annular member abutting said threaded member and having an annular flange adapted to receive the tubing, a nut adapted to surround the tubing and to be screwed on said threaded member, and driving means within said nut and adapted to be slid thereby, said means having an internal conical surface adapted to ride over said flange and drive the same angularly into the yielding material on being slid by said nut.

3. A coupling for tubing covered with a yielding material, comprising a threaded member to which the tubing is to be coupled, an annular member abutting said threaded member and having an annular flange adapted to receive the tubing, a nut adapted to surround the tubing and to be screwed on said threaded member, a ferrule adapted to surround the yielding material within said nut and having an internal conical surface at its forward end adapted to ride over said flange and drive the same into the yielding material on screwing of said nut, and means for forcing said ferrule into the yielding material at an area adjacent the rear end of the ferrule and for directing the rear extremity of the ferrule outwardly of said material.

4. A coupling for tubing covered with a yielding material, comprising a threaded member to which the tubing is to be coupled, an annular member abutting said threaded member and having a tubular portion adapted for insertion in the tubing, a surrounding annular flange forming an annular channel adapted to receive the wall of the tubing, a nut adapted to surround the tubing and to be screwed on said threaded member, and means associated with said nut for forcing said flange angularly into the yielding material on screwing of said nut.

5. A coupling for tubing covered with a yielding material, comprising a threaded member to which the tubing is to be coupled, an annular member abutting said threaded member and having a tubular portion adapted for insertion in the tubing, a surrounding annular flange forming an annular channel adapted to receive the wall of the tubing, a nut adapted to surround the tubing and to be screwed on said threaded member, and driving means within said nut and adapted to be slid thereby, said means having an internal conical surface adapted to ride over said flange and drive the same angularly into the yielding material on being slid by said nut.

6. A coupling for tubing covered with a yielding material, comprising a threaded member to which the tubing is to be coupled, an annular member abutting said threaded member and having a tubular portion adapted for insertion in the tubing, a surrounding annular flange forming an annular channel adapted to receive the wall of the tubing, a nut adapted to surround the tubing and to be screwed on said threaded member, a ferrule adapted to surround the yielding material within said nut and having an internal conical surface at its forward end adapted to ride over said flange and drive the same into the yielding material on screwing of said nut, and means for forcing said ferrule into the yielding material at an area adjacent the rear end of the ferrule and for directing the rear extremity of the ferrule outwardly of said material.

7. A coupling for tubing covered with a yielding material, comprising a threaded member to which the tubing is to be coupled, an annular member abutting said threaded member and having a tubular portion adapted for insertion in the tubing, a surrounding annular flange forming an annular channel adapted to receive the wall of the tubing, the base of said channel being restricted, a nut adapted to surround the tubing and to be screwed on said threaded member, and means associated with said nut for forcing said flange angularly into the yielding material on screwing of said nut.

8. A coupling for tubing covered with a yielding material, comprising a threaded member to which the tubing is to be coupled, an annular member abutting said threaded member and having a tubular portion adapted for insertion in the tubing, a surrounding annular flange forming an annular channel adapted to receive the wall of the tubing, the base of said channel being restricted, a nut adapted to surround the tubing and to be screwed on said threaded member, and driving means within said nut and adapted to be slid thereby, said means having an internal conical surface adapted to ride over said flange and drive the same angularly into the yielding material on being slid by said nut.

9. A coupling for tubing covered with a yielding material, comprising an externally threaded member to which the tubing is to be coupled, an annular member abutting said threaded member and having a tubular portion adapted for insertion in the tubing, a surrounding annular flange forming an annular channel adapted to receive the wall of the tubing, the base of said channel being restricted, a nut adapted to surround the tubing and to be screwed on said threaded member, a ferrule adapted to surround the yielding material within said nut and having an internal conical surface at its forward end adapted to ride over said flange and drive the same into the yielding material on screwing of said nut, and means for forcing said ferrule into the yielding material at an area adjacent the rear end of the ferrule and for directing the rear extremity of the ferrule outwardly of said material.

In testimony whereof I affix my signature.

FRANK B. STOVER.